(12) United States Patent
Repins et al.

(10) Patent No.: US 10,905,093 B2
(45) Date of Patent: Feb. 2, 2021

(54) PET BED

(71) Applicants: Ivars R. Repins, Shorewood, WI (US);
Michael R. Acedo, Tucson, AZ (US);
Stephen M. Groth, Grafton, WI (US);
Theodore E. Xistris, Shorewood, WI (US)

(72) Inventors: Ivars R. Repins, Shorewood, WI (US);
Michael R. Acedo, Tucson, AZ (US);
Stephen M. Groth, Grafton, WI (US);
Theodore E. Xistris, Shorewood, WI (US)

(*) Notice: Subject to any disclaimer, the term of this patent is extended or adjusted under 35 U.S.C. 154(b) by 306 days.

(21) Appl. No.: 16/014,743

(22) Filed: Jun. 21, 2018

(65) Prior Publication Data
US 2018/0368355 A1   Dec. 27, 2018

Related U.S. Application Data (60) Provisional application No. 62/525,022, filed on Jun. 26, 2017.

(51) Int. Cl.
*A01K 1/015*     (2006.01)
(52) U.S. Cl.
CPC .......... *A01K 1/0157* (2013.01); *A01K 1/0158* (2013.01)
(58) Field of Classification Search
CPC .............................. A01K 1/0157; A01K 1/015
USPC ....................................................... 119/28.5
See application file for complete search history.

(56) References Cited

U.S. PATENT DOCUMENTS

| | | |
|---|---|---|
| D125,280 S | 10/1940 | Little |
| 4,860,689 A * | 8/1989 | Stewart ................ A01K 1/0353 119/28.5 |
| 5,226,384 A | 7/1993 | Jordan |
| 5,826,537 A | 10/1998 | Heilborn |
| 6,196,157 B1 | 3/2001 | Northrop et al. |
| 6,237,531 B1 | 5/2001 | Peeples et al. |
| 6,851,385 B1 | 2/2005 | Poss et al. |
| D613,461 S | 4/2010 | Troya et al. |
| 7,926,447 B2 | 4/2011 | Flannery |
| D653,406 S | 1/2012 | Kahn et al. |
| D673,332 S | 12/2012 | Goding |
| 8,671,887 B2 | 3/2014 | Baker et al. |
| 8,783,211 B1 | 7/2014 | Weeden |
| 8,919,284 B2 | 12/2014 | Wolfe, Jr. et al. |

(Continued)

FOREIGN PATENT DOCUMENTS

| | | |
|---|---|---|
| CN | 102342252 | 2/2012 |
| DE | 202010005127 | 9/2010 |

(Continued)

*Primary Examiner* — Claude J Brown
(74) *Attorney, Agent, or Firm* — Ryan Kromholz & Manion, S.C.

(57) ABSTRACT

An apparatus according to the present invention provides a multiple piece pet bed having gradual depressions for the resting of body parts, and stackable supporting bed floors. The pet bed includes a supporting bed floor. The pet bed includes a detachable soft cover. The pet bed includes a cloth cover. The detachable soft cover and support bed floor may be preferably configured as polygons. A wall of the stackable supporting bed floor is adapted to engage a channel of a detachable soft cover. The multiple piece pet bed is designed to provide for mobility in use, comfort for the occupants, and cost savings in production.

20 Claims, 9 Drawing Sheets

(56) References Cited

U.S. PATENT DOCUMENTS

| | | |
|---|---|---|
| D725,832 S | 3/2015 | Coulter |
| D728,168 S | 4/2015 | Richardson |
| 9,060,494 B2 | 6/2015 | Simon et al. |
| D740,497 S | 10/2015 | Richardson et al. |
| 9,345,228 B2 | 5/2016 | Lowery et al. |
| D776,368 S | 1/2017 | Avalos Sartorio et al. |
| 2004/0237899 A1 | 12/2004 | Fung |
| 2006/0005773 A1* | 1/2006 | Brown ................ A01K 1/0353 119/28.5 |
| 2006/0254526 A1 | 11/2006 | Andriola |
| 2006/0272583 A1 | 12/2006 | Brown |
| 2006/0288943 A1* | 12/2006 | Ku ...................... A01K 1/0353 119/28.5 |
| 2008/0022935 A1* | 1/2008 | Fine .................... A01K 1/0353 119/28.5 |
| 2008/0127899 A1* | 6/2008 | Angus ................ A01K 1/0353 119/28.5 |
| 2008/0178812 A1 | 7/2008 | Dennis et al. |
| 2008/0307578 A1 | 12/2008 | Geremia et al. |
| 2011/0239946 A1 | 10/2011 | Ogle |
| 2012/0234247 A1 | 9/2012 | Graves et al. |
| 2012/0240860 A1 | 9/2012 | Suplina |
| 2012/0291710 A1 | 11/2012 | Hoffman et al. |
| 2012/0318206 A1 | 12/2012 | van Leeuwen |
| 2013/0047925 A1* | 2/2013 | Williams ............ A01K 1/0353 119/28.5 |
| 2014/0190417 A1* | 7/2014 | Lipscomb ........... A01K 1/0353 119/28.5 |
| 2014/0230735 A1 | 8/2014 | Coulter |
| 2016/0057970 A1* | 3/2016 | Lowery ............... A01K 1/0353 119/28.5 |
| 2016/0113239 A1 | 4/2016 | Hagemeier |
| 2016/0192615 A1 | 7/2016 | Parness |
| 2016/0198674 A1 | 7/2016 | Younger et al. |

FOREIGN PATENT DOCUMENTS

| | | |
|---|---|---|
| GB | 2286325 | 8/1995 |
| GB | 2345834 | 7/2000 |
| GB | 2428550 | 2/2007 |

* cited by examiner

PET BED

RELATED APPLICATION

This application claims the benefit of U.S. Provisional Patent Application Ser. No. 62/525,022, filed Jun. 26, 2017.

BACKGROUND OF THE INVENTION

Pet beds are a feature of many households. Pet beds vary in dimension and size. Pet beds include simple cloth mats. Pet beds also include a bedding surrounded by a wall structure. Pet beds may include pillow based inserts to form the walls or barriers of the bed. Pet beds may include metal structures as well a polymer based shells. Pet beds may be constructed out of a foam material for one or both of the bedding and wall(s) or barrier (s).

Pet beds may come in a variety of shapes. In addition, pet beds may be adorned with a number or variation of decorations.

Pet bed may incorporate a base structure to elevate the bed. Such a base structure may provide for ventilation of air and/or heating of the bedding.

While prior pet beds may be suitable for sleeping, the prior pert beds in general do not provide for a way for a pet to comfortably lay in the pet bed and observe the surroundings. The prior pet beds, with wall(s) or barrier (s) defining the pet bed, have wall (s) or barrier (s) which generally maintain a uniform height and do not provide for a varied height for the purpose of resting body parts.

The pet beds that exist with the varying height characteristic lack a defining quality for space management. Such pet beds lack the ability to be stacked to reduce space. Further, such beds are not capable of a multiple component structure.

Finally, the multiple component structure pert beds having a wall or barrier defining the pet bed generally seem to have weight restricting characteristics with respect to mobility.

A need appears to exist for a multiple piece pet bed having gradual depressions for the resting of body parts and stackable supporting bed floors. Further, a need exists for such a bed to be mobile while retaining a wall structure for resting body parts.

SUMMARY OF THE INVENTION

The present invention is directed to a multiple piece pet bed having gradual depressions for the resting of body parts, and stackable supporting bed floors. A pet bed comprising: a supporting bed floor comprising a wall structure; a primary cover, detachable soft cover, comprising a receiving channel; the primary cover, detachable soft cover, is detachably carried by at least the wall structure of said supporting bed floor; and a secondary cover, cloth cover, in detachable and layered communication with at least one of the primary cover, detachable soft cover, and the supporting bed floor.

The pet bed further comprising the wall structure is in detachable communication with at least the receiving channel. The primary cover, detachable soft cover, further comprising a closed cell skin material.

The pet bed further comprising the primary cover, detachable soft cover, having at least one side with a height, wherein a body portion may rest. The pet bed further comprising the wall structure is angled with respect to at least one of a first wall location and a second wall location.

The pet bed further comprising the supporting bed floor in communication with at least one of at least one extension, leg extension, and at least one member, footing member. The pet bed according further comprising the at least one member, footing member, is a friction member.

The supporting bed floor further comprising at least an injection-molded polymer. The pet bed further comprising the secondary cover, cloth cover, is in fitted communication with at least one of the primary cover, detachable soft cover, and the supporting bed floor. The pet bed further comprising the secondary cover, cloth cover, is in continuous communication with at least one of the primary cover, detachable soft cover, and the supporting bed floor.

Alternatively, a pet bed may comprise: a supporting bed floor comprising a wall structure; a primary cover comprising a receiving channel; the primary cover detachably carried by at least said wall structure of said supporting bed floor. The pet bed may further comprise a secondary cover in detachable communication with at least one of the primary cover and the supporting bed floor. The wall structure may be in detachable communication with at least the receiving channel. The primary cover may further comprise a closed cell skin material. The primary cover may have at least one side with a height, wherein a body portion may rest. The wall structure may be angled with respect to at least one of a first wall location and a second wall location. The supporting bed floor may be in communication with at least one of at least one extension and at least one member. The at least one member may be a friction member. The supporting bed floor may further comprise at least an injection-molded polymer. The secondary cover may be in at least one of fitted communication and continuous communication with at least one of the primary cover and the supporting bed floor.

The detachable soft cover and support bed floor may be preferably configured as polygons. Alternatively, the detachable soft cover supporting bed floor may be configured as circles. Alternatively, the detachable soft cover resting plain first side and supporting bed floor may be configured as ovals.

The detachable soft cover may mate around a wall of the supporting bed floor. The wall may extend from the supporting bed floor for at least a plurality of the supporting bed floor perimeter.

The wall may mate a receiving channel of the detachable soft cover. The wall mating with a plurality of receiving channels of the cushion layer. The wall comprises a singular or a plurality of segments.

The detachable soft cover may comprise of a single segment. The detachable soft cover may comprise of soft foam with a closed cell skin. The detachable soft cover may have at least one side with a height, and/or gradual depression, wherein a body portion may rest.

The supporting bed floor may be designed to accommodate stacking. The detachable soft cover having an entry point on a different side. The supporting bed floor may contain detachable footing members.

The pet bed may incorporate lighting on one or both of the detachable soft cover and supporting bed floor. The lighting may be puck lighting. The pet bed may incorporate a heating apparatus within the detachable soft cover. Alternatively, the pet bed may incorporate a heating apparatus within the supporting bed floor. Alternatively, the pet bed may incorporate a heating apparatus between the detachable soft cover and the supporting bed floor. Alternatively, the pet bed may incorporate a heating apparatus below the supporting bed floor. Alternatively, the pet bed may incorporate a heating apparatus around surfaces of the pet bed. The heating apparatus may be elliptical. Alternatively, the heating apparatus may have a geometric shape. Surfaces may include but are not limited to the surfaces of the detachable soft cover resting plain, surfaces of the detachable soft cover barrier, surfaces of the supporting bed floor resting plain, surfaces of the supporting bed floor wall, and surfaces of the footing members.

The invention may include a second preferred embodiment of support bed floor. The detachable soft cover and the second preferred embodiment of support bed floor may be preferably configured as polygons. Alternatively, the detachable soft cover supporting bed floor may be configured as circles. Alternatively, the detachable soft cover resting plain first side and supporting bed floor may be configured as ovals.

The detachable soft cover may mate around a wall of the second preferred embodiment of the supporting bed floor. The wall may extend from the second preferred embodiment of the supporting bed floor for at least a plurality of the second preferred embodiment of the supporting bed floor perimeter.

The wall may mate a receiving channel of the detachable soft cover. The wall mating with a plurality of receiving channels of the cushion layer. The wall comprises a singular or a plurality of segments.

The second preferred embodiment of the supporting bed floor may include a pattern of through holes. Each through hole may extend through the supporting bed floor resting plain first side to and beyond the supporting bed floor resting plain second side. The pattern of the through holes may preferably encompass a majority of the supporting bed floor, with the exception of the footing assembly locations. The through holes may be preferably square in orientation when viewed from either a supporting bed floor resting plain first side or a supporting bed floor resting plain second side. Alternatively, the through holes may be shaped as any polygon when viewed from either the supporting bed floor resting plain first side or the supporting bed floor resting plain second side. Alternatively, the through holes may be shaped as a circle or oval when viewed from either the supporting bed floor resting plain first side or the supporting bed floor resting plain second side. A flange may extend from a wall top of the second preferred embodiment of the supporting bed floor. The second preferred embodiment of the supporting bed floor may be designed to accommodate stacking. The supporting bed floor may contain detachable footing members.

The pet bed may incorporate lighting on one or both of the detachable soft cover and supporting bed floor. The lighting may be puck lighting. The pet bed may incorporate a heating apparatus within the detachable soft cover. Alternatively, the pet bed may incorporate a heating apparatus within the supporting bed floor. Alternatively, the pet bed may incorporate a heating apparatus between the detachable soft cover and the supporting bed floor. Alternatively, the pet bed may incorporate a heating apparatus below the supporting bed floor. Alternatively, the pet bed may incorporate a heating apparatus around surfaces of the pet bed. The heating apparatus may be elliptical. Alternatively, the heating apparatus may have a geometric shape. Surfaces may include but are not limited to the surfaces of the detachable soft cover resting plain, surfaces of the detachable soft cover barrier, surfaces of the supporting bed floor resting plain, surfaces of the supporting bed floor wall, and surfaces of the footing members.

The invention has the intended purpose of providing a multiple piece pet bed having gradual depressions for the resting of body parts and stackable supporting bed floors. Additionally, the invention has the intended purpose of providing a bed which is mobile while retaining a wall structure for resting body parts. Further, the invention provides the benefit of cost savings for reduced material in the construction of the pet bed.

DESCRIPTION OF THE PREFERRED EMBODIMENT

Although the disclosure hereof is detailed and exact to enable those skilled in the art to practice the invention, the physical embodiments herein disclose merely exemplify the invention which may be embodied in other specific structures. While the preferred embodiment has been described, the details may be changed without departing from the invention, which is defined by the claims.

Figure 1:
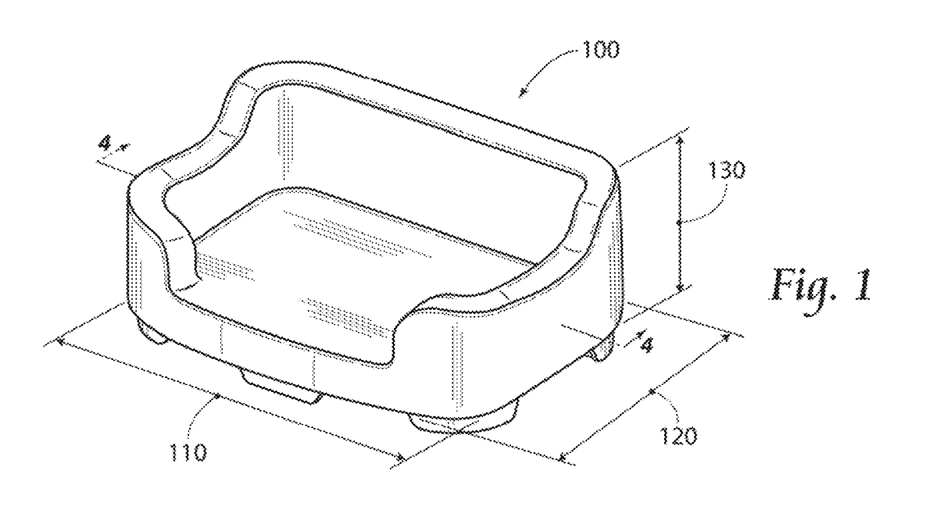
FIG. 1 is a perspective view of a pet bed.
Figure 2:
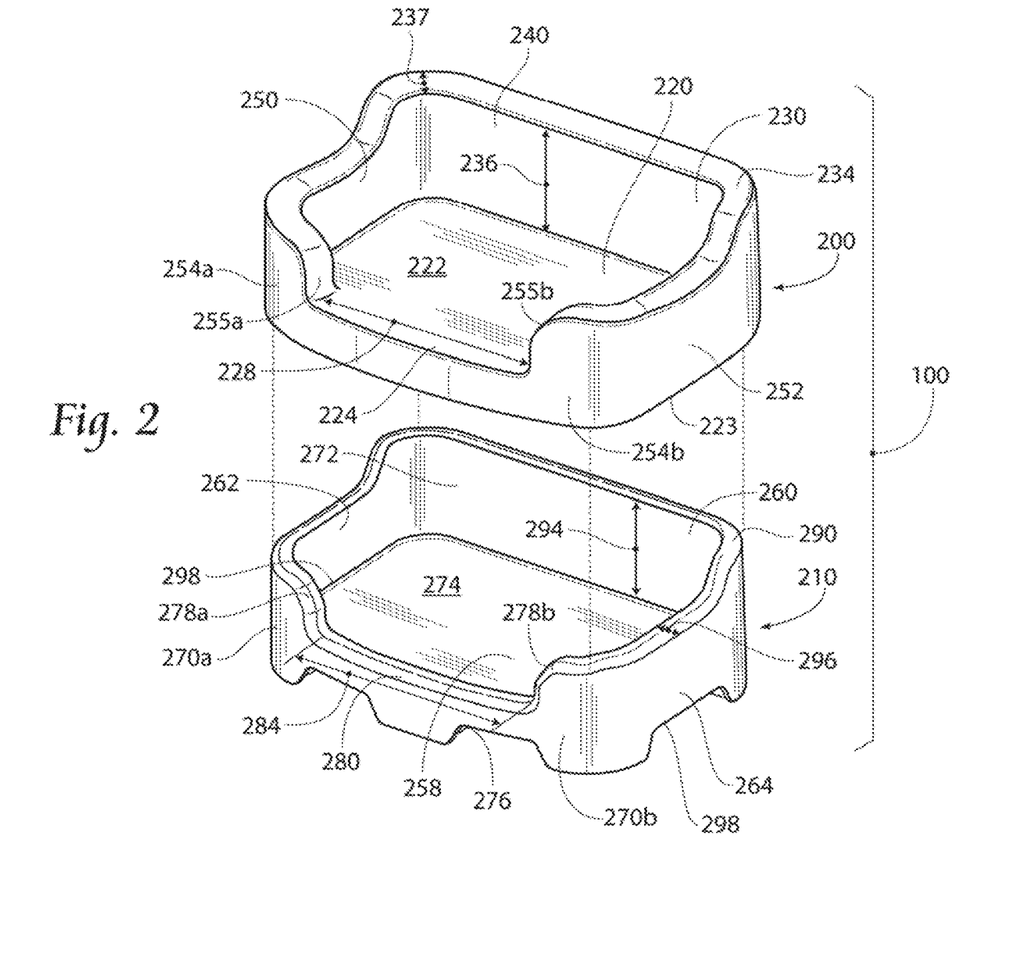
FIG. 2 is an exploded view of the pet bed, containing a first embodiment of a supporting bed floor.
Figure 3:
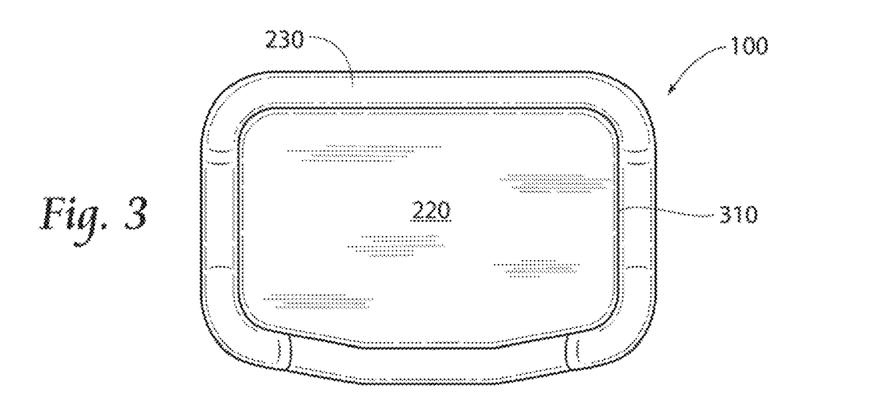
FIG. 3 is a top view of the pet bed.

With attention to FIG. 1, FIG. 2 and FIG. 3, a pet bed 100 is described. As illustrated in FIG. 1, a perspective view of the pet bed 100, the pet bed 100 is defined by a pet bed length 110, a pet bed width 120, and a pet bed height 130. As illustrated in FIG. 2, an exploded view if the pet bed 100, the pet bed preferably comprises a detachable soft cover 200 and a supporting bed floor 210. The detachable soft cover 200 is preferably comprised of a detachable soft cover resting plain 220 on which an object or animal may reside. The detachable soft cover 200 preferably is a single segment. The detachable soft cover 200 preferably comprises soft foam with a closed cell skin. Alternatively, the detachable soft cover 200 comprises a polymer, carbon fiber, carbon based metal, non-carbon based metal, or cloth matrix. Alternatively, the detachable soft cover 200 comprises a matrix containing a combination of one or more of soft foam with a closed cell skin, polymer, carbon fiber, and cloth.

The detachable soft cover resting plain 220 preferably contains a detachable soft cover resting plain first side 222, a detachable soft cover resting plain second side 223, and detachable soft cover resting plain lateral sides (not illustrated in the figures). The detachable soft cover resting plain first side 222 and the detachable soft cover resting plain second side 223 are separated by the detachable soft cover resting plain lateral sides (not illustrated in the figures). The detachable soft cover resting plain first side 222 and the detachable soft cover resting plain second side 223 are preferably configured as polygons. Alternatively, the detachable soft cover resting plain first side 222 and the detachable soft cover resting plain second side 223 may be configured as circles. Alternatively, the detachable soft cover resting plain first side 222 and the detachable soft cover resting plain second side 223 may be configured as ovals.

The detachable soft cover resting plain lateral sides (not illustrated in the figures) are preferably in contact with a detachable soft cover barrier 230 forming the pet bed height 130. As illustrated in FIG. 3, the detachable soft cover barrier 230 extends from the detachable soft cover resting plain 220 for at least a plurality of a detachable soft cover resting plain perimeter 310. The detachable soft cover barrier 230 possesses a barrier height 236. The barrier height 236 preferably varies along the detachable soft cover barrier 230 as the detachable soft cover barrier 230 traverses around the detachable soft cover resting plain 220. Alternatively, the barrier height 236 remains constant along the detachable soft cover barrier 230 as the detachable soft cover barrier 230 traverses around the detachable soft cover resting plain 220. The detachable soft cover barrier 230 possesses a barrier top 234 at the barrier height 236. The detachable soft cover barrier 230 preferably possesses a constant barrier width 237 along the barrier height 236. Alternatively, the detachable soft cover barrier 230 possesses a varying barrier width 237 along the barrier height 236.

The detachable soft cover barrier 230 preferably comprises the following segments: a back barrier 240; a left side barrier 250; a right side barrier 252; a first front barrier end 254a; and a second front barrier end 254b. The back barrier 240, left side barrier 250, right side barrier 252, first front barrier end 254a, and second front barrier end 254b are in moldable communication with one another. The detachable soft cover barrier 230 is in moldable communication with the detachable soft cover resting plain 220.

At a first leading side 255a of the first front barrier end 254a, the detachable soft cover barrier 230 preferably ceases progression along the detachable soft cover resting plain lateral sides (not illustrated in the figures). At a second leading side 255b of the second front barrier end 254b, the detachable soft cover barrier 230 preferably ceases progression along the detachable soft cover resting plain lateral sides (not illustrated in the figures). Between the oppositely facing first leading side 255a and second leading side 255b preferably resides an opening 224. The opening 224 is preferably planar to and in continuous communication with the detachable soft cover resting plain first side 222. The opening 224 possesses a length 228 between the first leading side 255a and second leading side 255b.

As illustrated in FIG. 2, a first embodiment of the supporting bed floor 210 involves the following. The supporting bed floor 210 is comprised of a supporting bed floor resting plain 258 on which the detachable soft cover resting plain second side 223 is in communication. The supporting bed floor resting plain 258 contains a supporting bed floor resting plain first side 274, a supporting bed floor resting plain second side 276, and supporting bed floor resting plain lateral sides (not illustrated in the figures). The supporting bed floor resting plain first side 274 and the supporting bed floor resting plain second side 276 are separated by the supporting bed floor resting plain lateral sides (not illustrated in the figures). The supporting bed floor resting plain first side 274 and the supporting bed floor resting plain second side 276 are configured as polygons. Alternatively, the supporting bed floor resting plain first side 274 and the supporting bed floor resting plain second side 276 are configured as circles. Alternatively, the supporting bed floor resting plain first side 274 and the supporting bed floor resting plain second side 276 are configured as ovals.

The supporting bed floor resting plain lateral sides (not illustrated in the figures) are in contact with a supporting bed floor wall 260 forming the supporting bed floor 210. The supporting bed floor wall 260 extends from the supporting bed floor resting plain 258 for at least a plurality of a supporting bed floor perimeter 298. The supporting bed floor wall 260 possesses a wall height 294. The wall height 294 varies along the supporting bed floor wall 260 as the supporting bed floor wall 260 traverses around the supporting bed floor resting plain 258. Alternatively, the wall height 294 remains constant along the supporting bed floor wall 260 as the supporting bed floor wall 260 traverses around the supporting bed floor resting plain 258. The supporting bed floor wall 260 possesses a wall top 290 at the wall height 294. Alternatively, a flange (not illustrated in the figures) may extend from, and in a different plane with respect to, the wall top 290. The flange (not illustrated in the figures) may extend away from the supporting bed floor resting plain 258, The flange (not illustrated in the figures) may be continuous along the supporting bed floor wall 260. Alternatively, the flange (not illustrated in the figures) may be intermittent along the supporting bed floor wall 260. Excluding the flange (not illustrated in the figures), the supporting bed floor wall 260 possesses a constant wall width 296 along the wall height 294. Alternatively, excluding the flange (not illustrated in the figures), the supporting bed floor wall 260 possesses a variable wall width 296 along the wall height 294.

The supporting bed floor wall 260 comprises the following segments: a back wall 272; a left side wall 262; a right side wall 264; a first front wall end 270a; a second front wall end 270b; and a second opening wall 280. The back, wall 272, left side wall 262, right side wall 264, first front wall end 270a, second front wall end 270b, and the second opening wall 280 are in moldable communication with one another. The supporting bed floor wall 260 is in moldable communication with the supporting bed floor resting plain 258. The supporting bed floor-wall 260 is a singular segment. Alternatively, the supporting bed floor wall 260 comprises a plurality of segments.

At a first leading side 278a of the first front wall end 270a, the supporting bed floor wall 260 lowers in elevation to the second opening wall 280. At a second leading side 278b of the second front wall end 270b, the supporting bed floor wall 260 lowers in elevation to the second opening wall 280. Between the oppositely facing first leading side 278a and second leading side 278b resides the second opening wall 280. The second opening wall 280 is in continuous communication with the supporting bed floor resting plain first side 274. The second opening wall 280 is preferably not planar with the supporting bed floor resting plain first side 274. Alternatively, the second opening wall 280 is planar with the supporting bed floor resting plain first side 274. The second opening wall 280 possesses a second opening length 284 between the first leading side 278a and second leading side 278b.

The supporting bed floor (210, 1210) has a material make up of a polymer. Preferably the supporting bed floor (210, 1210) comprises at least an injection-molded polymer. Alternatively, the supporting bed floor (210, 1210) has a material make up of a carbon matrix, carbon based metal, or non-carbon based metal. Alternatively, the supporting bed floor (210, 1210) has a material make up of a combination of at least two of a polymer, a carbon matrix, carbon based metal, or non-carbon based metal.

With attention to FIG. 12, FIG. 13, FIG. 14, and FIG. 15, a second and preferred embodiment of the supporting bed floor 1210 involves the following. The supporting bed floor 1210 is preferably comprised of a supporting bed floor resting plain 1258 on which the detachable soft cover resting plain second side 223 is in communication. The supporting bed floor resting plain 1258 preferably contains a supporting bed floor resting plain first side 1274, a supporting bed floor resting plain second side 1376, and supporting bed floor resting plain lateral sides (not illustrated in the figures). The supporting bed floor resting plain first side 1274 and the supporting bed floor resting plain second side 1376 are separated by the supporting bed floor resting plain lateral sides (not illustrated in the figures). The supporting bed floor resting plain first side 1274 and the supporting bed floor resting plain second side 1376 are preferably configured as polygons. Alternatively, the supporting bed floor resting plain first side 1274 and the supporting bed floor resting plain second side 1376 are configured as circles. Alternatively, the supporting bed floor resting plain first side 1274 and the supporting bed floor resting plain second side 1376 are configured as ovals. The supporting bed floor 1210 contains a pattern 1286 of through holes 1288. Each through hole 1288 extends through the supporting bed floor resting plain first side 1274 to and beyond the supporting bed floor resting plain second side 1376. The pattern 1286 of the through holes 1288 encompasses a majority of the supporting bed floor 1210, with the exception of the footing assembly 1287 (the footing assemblies are discussed at a later point in the disclosure) locations. The through holes 1288 are preferably square in orientation when viewed from either the supporting bed floor resting plain first side 1274 or the supporting bed floor resting plain second side 1376. Alternatively, the through holes 1288 may be shaped as any polygon when viewed from either the supporting bed floor resting plain first side 1274 or the supporting bed floor resting plain second side 1376. Alternatively, the through holes 1288 may be shaped as a circle or oval when viewed from either the supporting bed floor resting plain first side 1274 or the supporting bed floor resting plain second side 1376.

Figure 12:
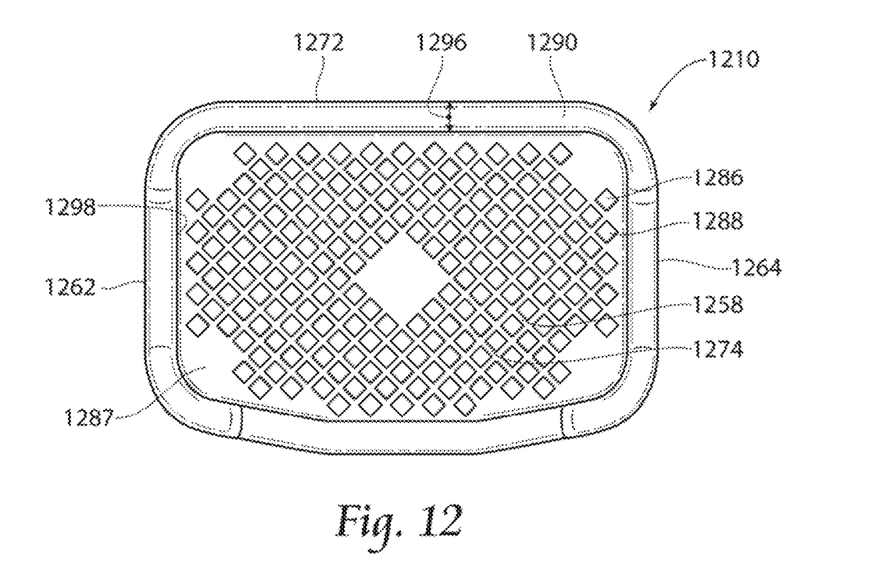
FIG. 12 top view of a second embodiment of the supporting bed floor.
Figure 13:
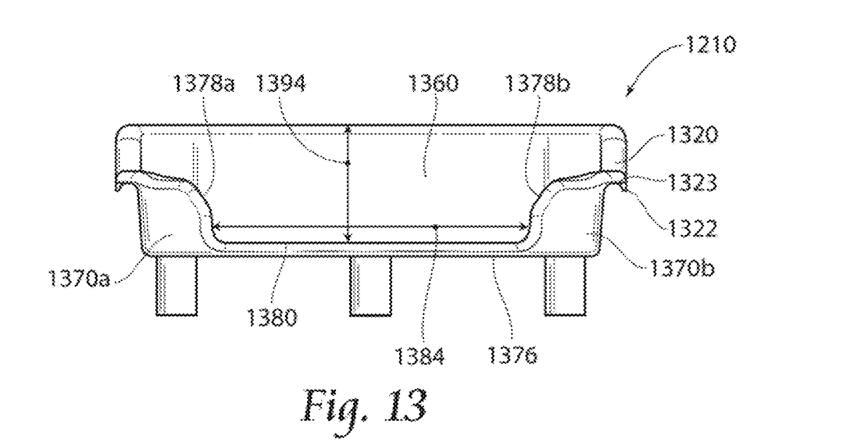
FIG. 13 is a front view of the second embodiment of the supporting bed floor.
Figure 14:
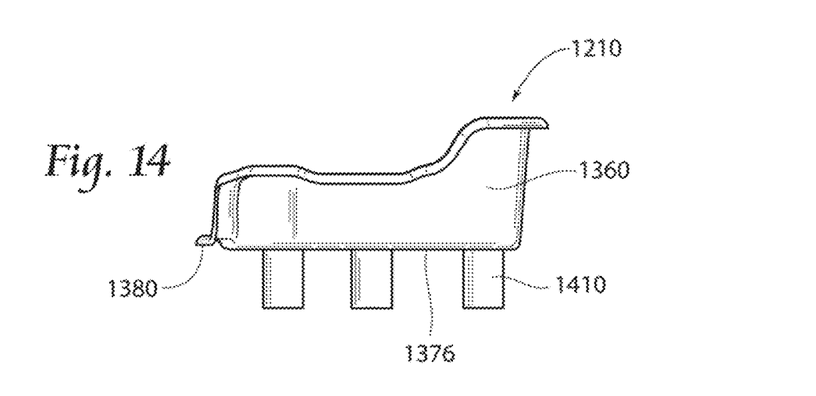
FIG. 14 is a side view of the second embodiment of the supporting bed floor.

The supporting bed floor resting plain lateral sides (not illustrated in the figures) are preferably in contact with a supporting bed floor wall 1360 forming the supporting bed floor 1210. The supporting bed floor wall 1360 extends from the supporting bed floor resting plain 1258 for at least a plurality of a supporting bed floor perimeter 1298. The supporting bed floor wall 1360 possesses a wall height 1394. The wall height 1394 preferably varies along the supporting bed floor wall 1360 as the supporting bed floor wall 1360 traverses around the supporting bed floor resting plain 1258. Alternatively, the wall height 1394 remains constant along the supporting bed floor wall 1360 as the supporting bed floor wall 1360 traverses around the supporting bed floor resting plain 1258. The supporting bed floor wall 1360 possesses a wall top 1290 at the wall height 1394. The wall height 1394 extends between the wall top 1290 and the supporting bed floor resting plain first side 1274.

A flange 1320 extends from, and planar with respect to, the wall top 1290. Alternatively, the flange 1320 may extend from the wall top 1290 in a manner not planar to the wall top 1290. The flange 1320 extends away from the supporting bed floor resting plain 1258. A flange end 1322 extends perpendicular with the flange 1320 from the flange 1320 at a flange elbow 1323 for a predetermined distance. Alternatively, a flange end 1322 extends close to perpendicular with the flange 1320 from the flange 1320 at a flange elbow 1323 for a predetermined distance. The flange 1320 is continuous along the supporting bed floor wall 1360. Alternatively, the flange 1320 may be intermittent along the supporting bed floor wall 1360.

Excluding the flange (not illustrated in the figures), the supporting bed floor wall 1360 preferably possesses a constant wall width 1296 along the wall height 1394. Alternatively, excluding the flange 1320, the supporting bed floor wall 1360 possesses a variable wall width 1296 along the wall height 1394.

The supporting bed floor wall 1360 preferably comprises the following segments: a back wall 1272; a left side wall 1262; a right side wall 1264; a first front wall end 1370a; a second front wall end 1370b; and a second opening wall 1380. The back wall 1272, left side wall 1262, right side wall 1264, first front wall end 1370a, second front wall end 1370b, and the second opening wall 1380 are in moldable communication with one another. The supporting bed floor wall 1360 is in moldable communication with the supporting bed floor-resting plain 1258. The supporting bed floor wall 1360 is preferably a singular segment. Alternatively, the supporting bed floor wall 1360 comprises a plurality of segments.

At a first leading side 1378a of the first front wall end 1370a, the supporting bed floor wall 1360 preferably lowers in elevation to the second opening wall 1380. At a second leading side 1378b of the second front wall end 1370b, the supporting bed floor wall 1360 preferably lowers in elevation to the second opening wall 1380. Between the oppositely facing first leading side 1378a and second leading side 278b preferably resides the lower second opening wall 1380. The second opening wall 1380 is preferably not planar to, and in continuous communication with, the supporting bed floor resting plain first side 1274. The second opening wall 1380 possesses a second opening length 1384 between the first leading side 1378a and second leading side 1378b.

The supporting bed floor 1210 has a material make up of a polymer. Preferably the supporting bed floor (210, 1210)

comprises at least an injection-molded polymer. Alternatively, the supporting bed floor 1210 has a material make up of a carbon matrix, carbon based metal, or non-carbon based metal. Alternatively, the supporting bed floor 1210 has a material make up of a combination of at least two of a polymer, a carbon matrix, carbon based metal, or non-carbon based metal. The second and preferred embodiment of the supporting bed floor 1210 provides the benefit of cost savings for reduced material in the construction of the pet bed.

Figure 4:
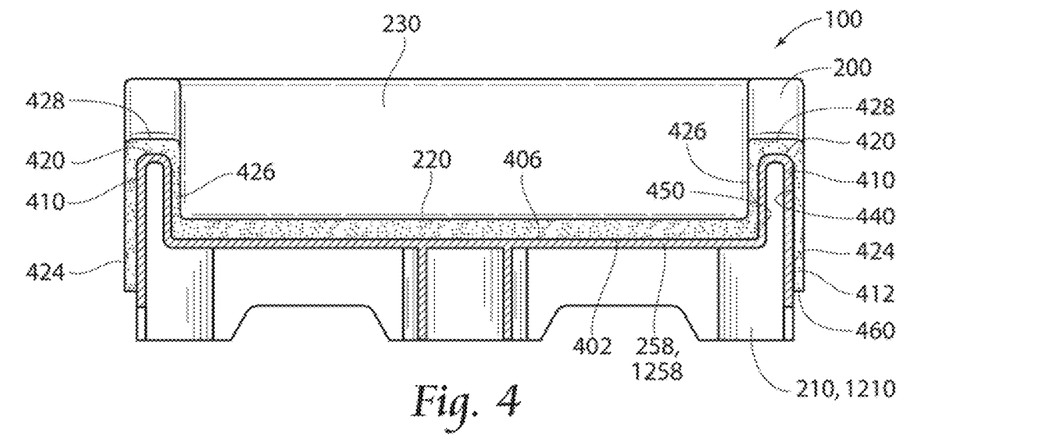
FIG. 4 is a sectional view of the pet bed, illustrating the seating of a detachable soft cover onto a supporting bed floor.
Figure 5:
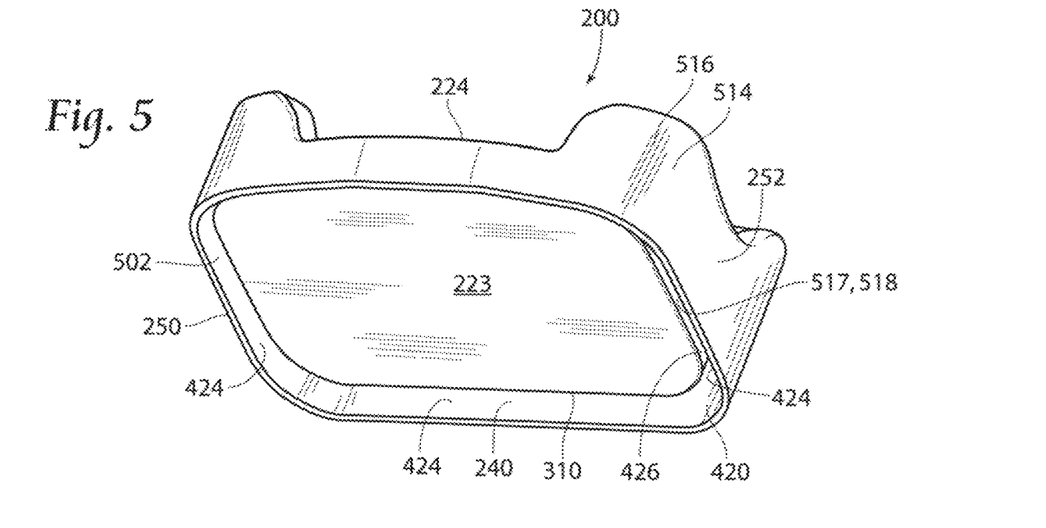
FIG. 5 is a bottom view of the detachable soft cover.

With attention to FIG. 4 and FIG. 5, the pairing of the detachable soft cover 200 and supporting bed floor 210 is illustrated. FIG. 4 is a section view of the pet bad 100 having the detachable soft cover 200 seated on the supporting bed floor 210. The detachable soft cover 200 is in removable communication with the supporting bed floor (210, 1210). The detachable soft cover resting plain 220 is in communication with the supporting bed floor resting plain (258, 1258). Specifically, the detachable soft cover resting plain second side 406 is in communication with the supporting bed floor resting plain first side 402.

Turning to the section view of the detachable soft cover barrier 412 and supporting bed floor wall 410, the supporting bed floor wall 410 resides in a receiving channel 420 within the detachable soft cover barrier 412 in detachable communication with the receiving channel 420. As provided in FIG. 4 and FIG. 5, illustrating a bottom view of the detachable soft cover 200, from the perspective of the detachable soft cover resting plain second side 223, the receiving channel 420 commences with a receiving channel entry 502 defined by a receiving channel first side 424 and a receiving channel second side 426. The receiving channel first side 424 is preferably the detachable soft cover barrier portion 514 forming exterior lateral sides 516 of the detachable soft cover barrier 230. The receiving channel first side 424 extends around the detachable soft cover resting plain perimeter 310. Alternatively, the receiving channel first side 424 may comprise an interior wall of the detachable soft cover barrier 230. The receiving channel second side 426 is preferably the detachable soft cover barrier second portion 517 forming resting plain lateral sides 518 of the detachable soft cover barrier 230. The receiving channel second side 426 extends around the detachable soft cover resting plain perimeter 310. Alternatively, the receiving channel second side 426 may comprise an interior wall of the detachable soft cover barrier 230. The receiving channel first side 424 and the receiving channel second side 426 are preferably moldably connected with a receiving channel third side 428 to form the receiving channel 420 within the detachable soft cover barrier 230.

The receiving channel first side 424 and the receiving channel second side 426 are ipsilateral with respect to the receiving channel third side 428. The receiving channel first side 424 and the receiving channel second side 426 are preferably parallel to one another. Alternatively, the channel first side interior wall 440 may be angled towards the detachable soft cover resting plain 220 from the receiving channel third side 428 in a direction of the detachable soft cover resting plain 220 to accommodate insertion of the supporting bed floor wall 410. Alternatively, the channel second side interior wall 450 may be angled away from the detachable soft cover resting plain 220 from the receiving channel third side 428 in a direction of an end 460 to accommodate insertion of the supporting bed floor wall 410. Alternatively, the channel first side interior wall 440 may be angled towards the detachable soft cover resting plain 220 from the receiving channel third side 428 in a direction of the detachable soft cover resting plain 220, and the channel second side interior wall 450 may be angled away from the detachable soft cover resting plain 220 from the receiving channel third side 428 in a direction of the end 460, to accommodate insertion of the supporting bed floor wall 410. Alternatively, the receiving channel 420 may comprise a plurality of receiving channels. Thus, the wall may mate with a plurality of receiving channels of the cushion layer.

Figures 6, 7, 8A:
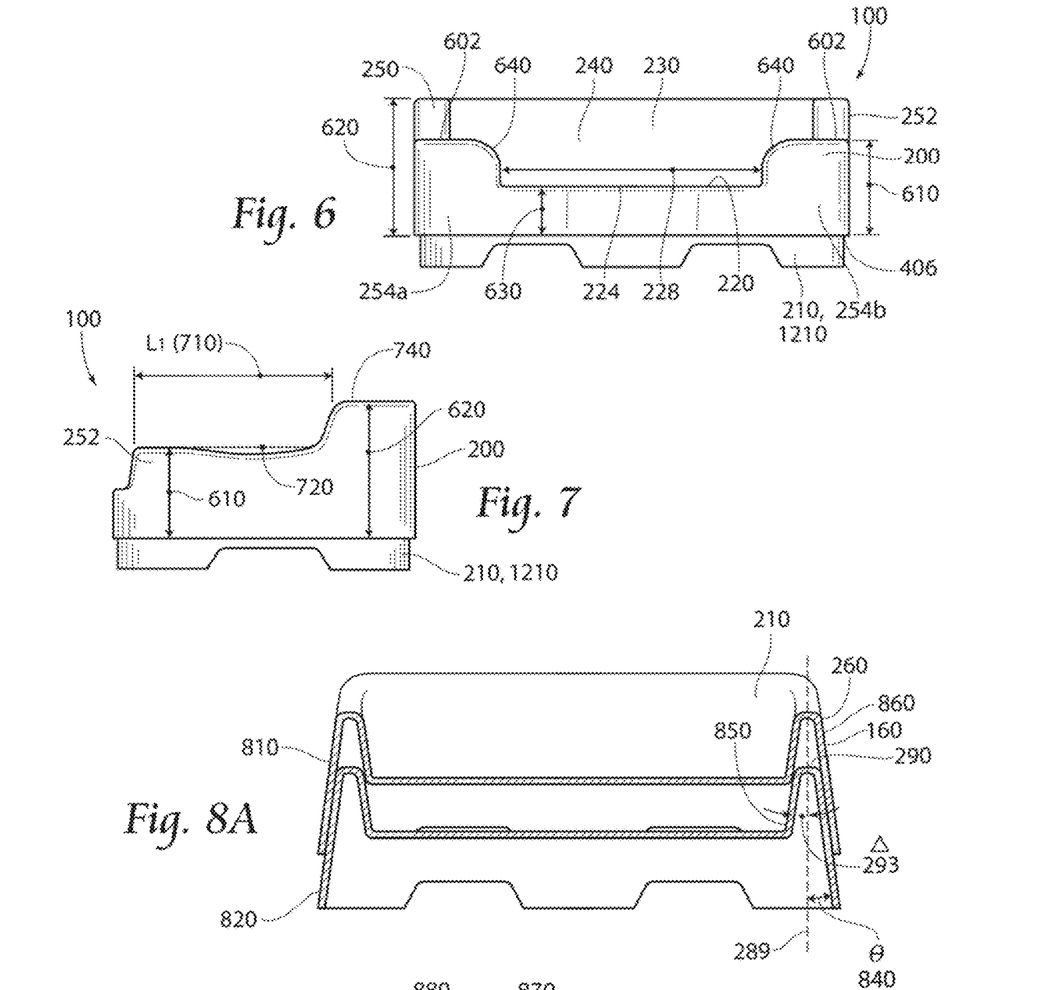
FIG. 6 is a front view of the pet bed.
FIG. 7 is a side view of the pet bed.
FIG. 8A is a sectional view of two stackable first embodiments of the supporting bed floor.

With attention to FIG. 6 and FIG. 7, dimensions of a resting area 602 are illustrated. FIG. 6, a front view of the pet bed 100, illustrates the first front barrier end 254a and second barrier end 254b have a first height 610. As illustrated in FIG. 7, a side view of the pet bed 100, the first height 610 extends from the first front barrier end 254a to the left side barrier 250, and from the second front barrier 254b to the right side barrier 252. Alternatively, the first height 610 may extend to various dimensional sides where the dimension of the pet bed 100 has more than or less than the number of sides as in the preferred embodiment. The first height preferably extends a length $L_1$ (710) along both the left side barrier 250 and the right side barrier 252. Alternatively, the first height may extend a length $L_1$ (710) along one of the left side barrier 250 or the right side barrier 252. The length $L_1$ preferably extends from the opening 224 towards the back barrier 240. Alternatively, the length $L_1$ may extend in a direction defined by the commencement and end of sides to the pet bed 100 where the pet bed 100 contains more sides than that in the ideal embodiment.

Along the length $L_1$ (710), first height 610 gradually adjusts to form a gradual depression, first semi-circular concave, 720 on which a body portion or other part may rest. The gradual depression preferably is located on both the left side barrier 250 and the right side barrier 252. Alternatively, the gradual depression may be located on the left side barrier 250 or the right side barrier 252. At the length $L_1$ (710) from the opening, the first height 610 increases to a second height 620. The height 620 continues through the back barrier 240. Alternatively, the height 620 may continue for an unspecified distance where the pet bed 100 contains more sides than that in the ideal embodiment. The detachable soft cover 200 preferably has the opening 224, for an entry point, on a different side than the gradual depression 720.

The opening 224 of the detachable soft cover 200 contains an opening height 630. As noted earlier the opening 224 is opening 224 is preferably planar to and in continuous communication with the detachable soft cover resting plain first side 222. Height 630 is preferably less than first height 610. The first connection 640 between the opening 224 and the first front barrier end 254a, as well as from the opening 224 to second front barrier 254b, is preferably a gradual arc. Alternatively, the first connection 640 between the opening 224 and the first front barrier end 254a, as well as from the opening 224 to second front barrier 254b, may contain one or more vertices. Preferably, along left side barrier 250 and the right side barrier 252, the second connection 740 between the first height 610 and second height 620 is preferably a gradual arc. Alternatively, the first connection 640 between the first height 610 and the second height 620 may contain one or more vertices.

Figure 8B:
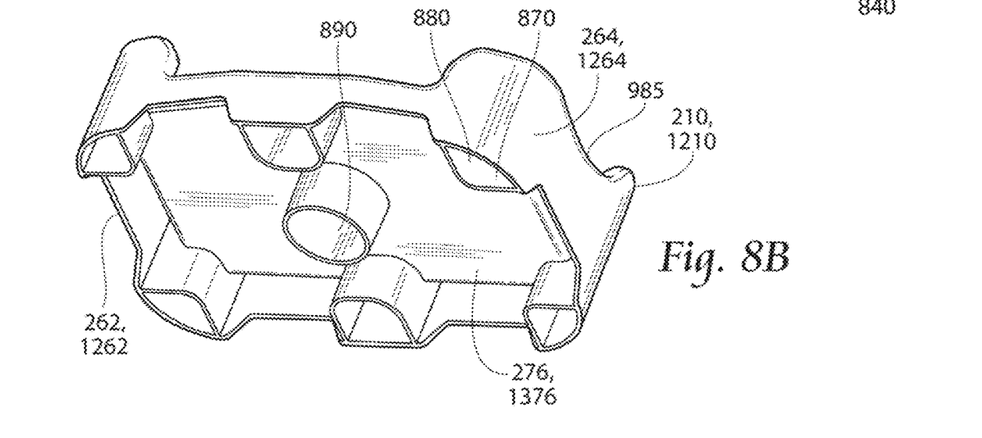
FIG. 8B is a bottom view of the first embodiment of the supporting bed floor.

As illustrated in FIG. 8B, at least one of the left side wall (262, 1262) and the right side wall (264, 1264) of the supporting bed floor wall (260, 1360) of the supporting bed floor (210, 1210) comprises a second gradual depression, second semi-circular concave, 985 along the wall top 290. Wherein the gradual depression, first semi-circular concave, 956 and the second gradual depression, second semi-circular concave, 985 are in layered communication on which a body portion or other part may rest.

With attention to FIGS. 8A and 8B, the first embodiment of the supporting bed floor 210 is stackable. As illustrated in FIG. 8A, a first supporting bed floor 810 is stackable on a second supporting bed floor 820. The supporting bed floor wall 260 contains an interior section 850 and exterior section 860. The exterior section 860 is angled away from the interior section 850 along the entire supporting bed floor perimeter 298, including the section defining the second opening wall 280. Specifically, the exterior section 860 is angled away from a plane 289 at an angle θ (840) along the entire supporting bed floor perimeter 298, including the section defining the second opening wall 280. The plane 290 intersecting the wall top 290 at least substantially perpendicular to the wall top 290. Additionally, the interior section 850 is angled away from a plane 289 at an angle Δ (293) along the entire supporting bed floor perimeter 298, including the section defining the second opening wall 280. Combination of the angle θ (840) and the angle Δ (293) provides for the stacking of multiple supporting bed floors 210. Thus, the supporting bed floor wall 260 has an angled orientation with respect to the wall top 290 to provide for stacking.

FIG. 8B, a bottom view of the supporting bed floor 210, illustrates footing members 870 which alternatively may be moldably applied to the supporting bed floor resting plain second side 276. The footing members 870 are preferably arranged in the corners 880 of the supporting bed floor 210 and in the center 890 of the supporting bed floor 210. At least one footing member 870 is arranged in close proximity to the center 890 of the supporting bed floor 210. Alternatively, the footing members 870 may be arranged in various patterns dependent on the shape of the supporting bed floor 210, the shape of the pet bed 100, and/or the use of the supporting bed floor 210 or the pet bed 100. Alternatively, the supporting bed floor 210 may contain detachable footing members 870. It is observed the footing members 870 may be cylindrical. Alternatively, the foot members 870 may be spherical. Alternatively, the footing members 870 may be a polyhedron.

Figure 20:
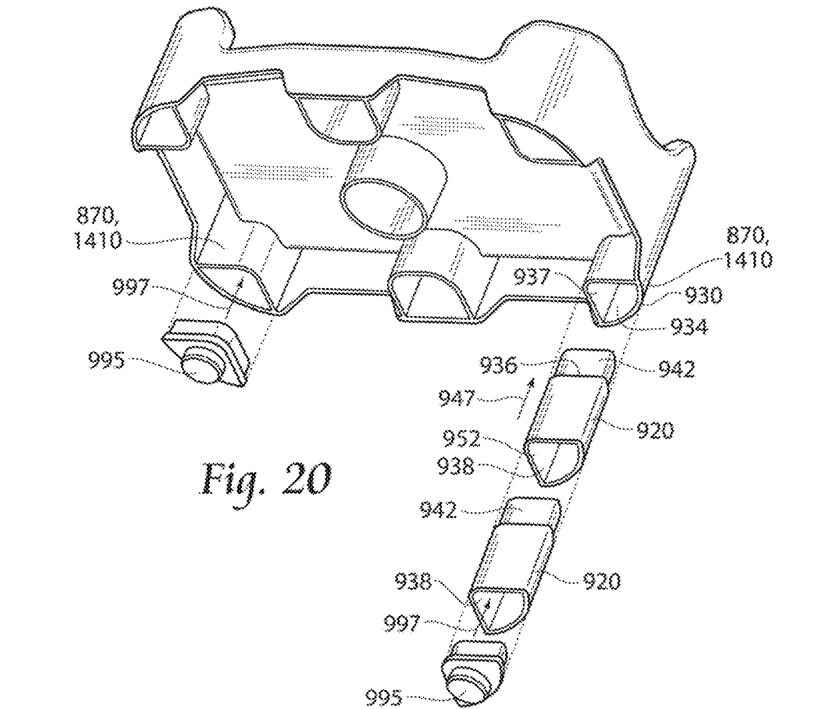
FIG. 20 is a bottom view of the first embodiment of the supporting bed floor incorporating at least one leg extension and at least one polymer foot.
Figure 21:
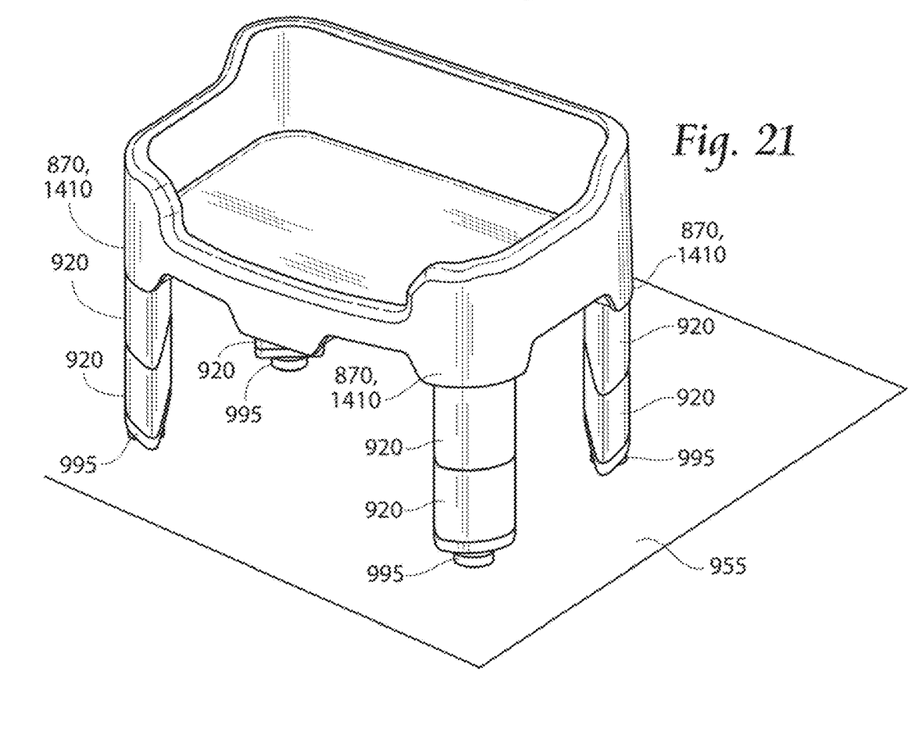
FIG. 21 is a perspective view of the first embodiment of the supporting bed floor incorporating at least one leg extension and at least one polymer foot in communication with a surface.

As illustrated in FIG. 20 and FIG. 21, at least one footing member (870, 1410) contains a footing member base 930, wherein the footing member base is in communication with a surface 955 to provide communication between the pet bed 100 and the surface 955. The footing member base 930 provides for a cavity 934 extending into an interior 937 of the at least one footing member (870, 1410). A leg extension 920 is in communication with the at least one footing member (870, 1410) at the footing member base 930. The leg extension 920 comprises a first end 936 and an opposite second end 938. The first end 936 in communication with a first end extension 942, wherein the first end extension 942 extends in a direction 947 opposite the second end 938. The second end 938 providing for a second end cavity, wherein the second end cavity 952 is substantially similar in dimension to the cavity 934. Alternatively, the second end cavity 952 is less than substantially similar in dimension to the cavity 934. The first end extension 942 inserts into the cavity 934 of the at least one footing member (870, 1410), wherein the first end extension 942 raises the height of the supporting bed floor (210, 1210) above the surface 955. The first end extension is preferably in pressure fit communication with the at least one footing member (870, 1410). A second leg extension 920 may be applied to the initial leg extension 920 wherein the first end extension 942 of the second leg extension 920 is in communication with the second end cavity 952 of the first leg extension 920. The first leg extension 920 and the second leg extension 920 are preferably in pressure fit communication. Further, subsequent n+1 leg extensions 920 may be in pressure fit communication with the previous n leg extension 920 to raise the supporting bed floor (210, 1210) above the surface 955. The ability to elevating the supporting bed floor (210, 1210) above the surface 955 provides for orthopedic features benefiting the occupant of the pet bed 100.

At least one polymer foot 995 is in communication 997 with at least one of at least one footing member base 930 and at least one second end 938 of the at least one leg extension 920. Application of the at least one polymer foot 995 provides for at least substantially reduced sliding of the pet bed 100 on the surface, increased friction between the pet bed 100 and the surface 955, where damage to the surface 955 is reduced and stability of the pet bed 100 is improved.

Figure 18:
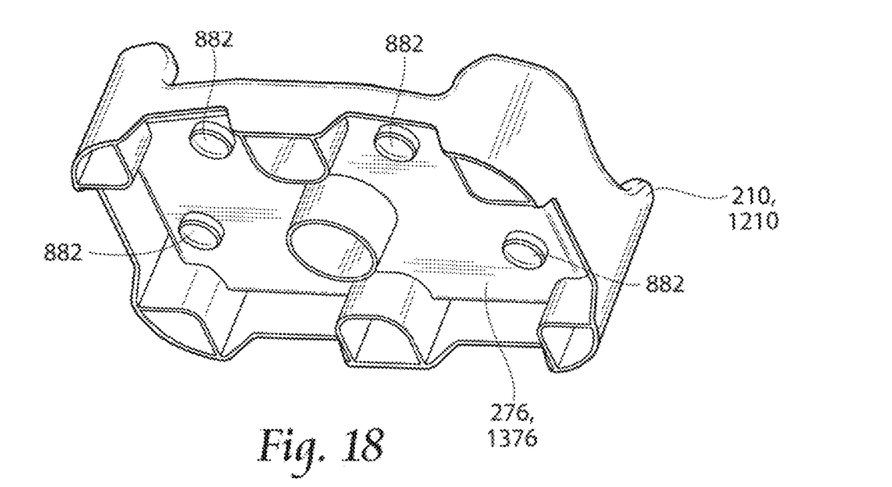
FIG. 18 is a bottom view of the first embodiment of the supporting bed floor containing at least one lighting element.

As illustrated in FIG. 18, the pet bed 100 may incorporate lighting on one or both of the detachable soft cover 200 and supporting bed floor 210. The lighting may be at least one lighting element 882. The at least one lighting element 882 is preferably in communication with the supporting bed floor resting plain second side 1376. The at least one lighting element 882 is preferably puck lighting. Alternatively, the at least one lighting element 882 may be LED lighting. Alternatively, the at least one lighting element 882 may be any form of lighting known in the industry. The at least one lighting element 882 is preferably controlled by a remote communication device, not illustrated in the figures. The at least one lighting element 882 may illuminate more than one color. The at least one remote lighting device 882 may change colors. The at least one remote lighting device 882 may turn on and off in various sequences. Various at least one lighting element 882 incorporated on the pet bed 100 may have various color and lighting sequences. The color and lighting features of the at least one remote lighting device 882 are controlled by the remote communication device, not illustrated in the figures.

Figure 17:
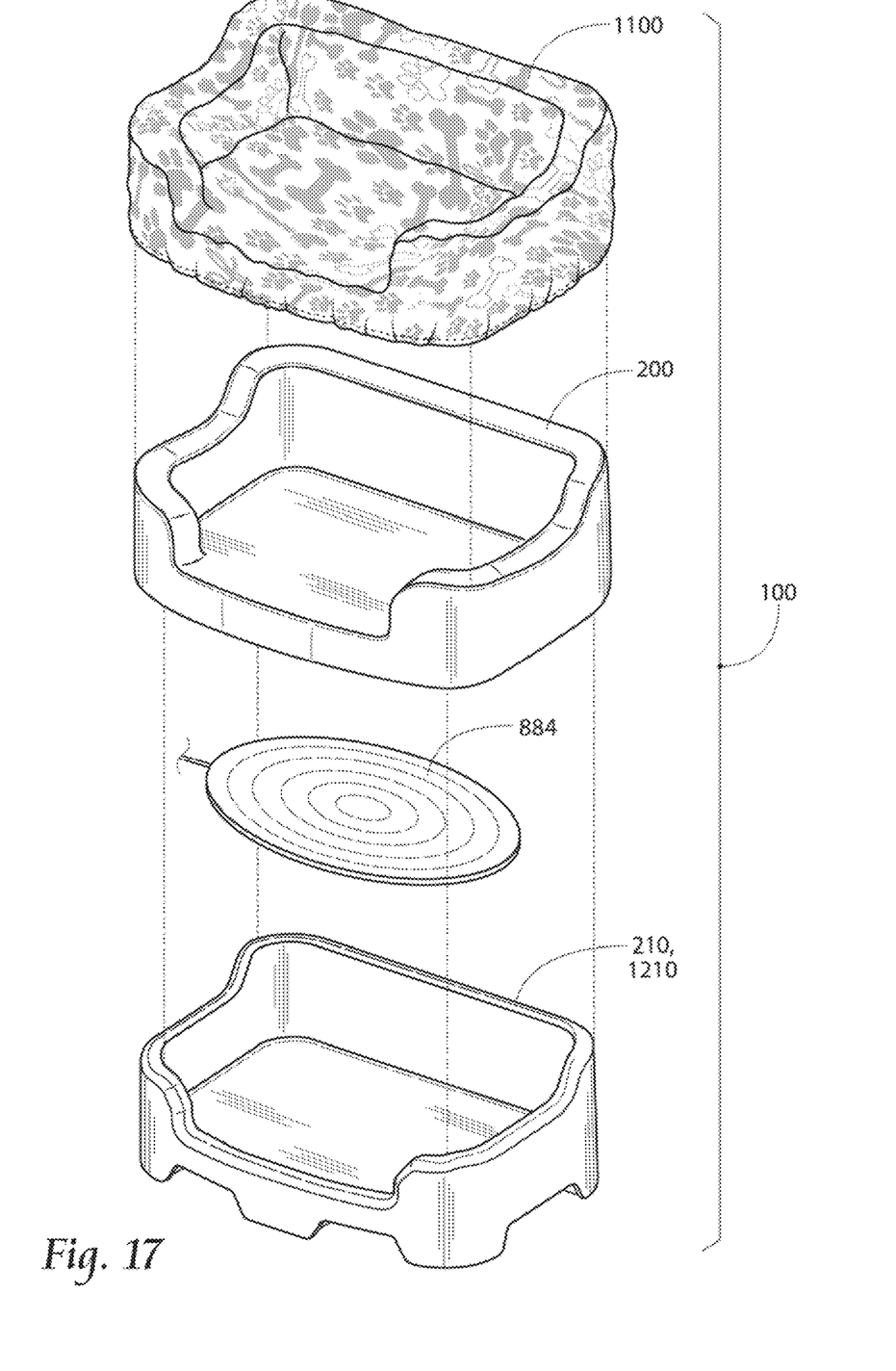
FIG. 17 is an exploded view of the pet bed, containing the cloth cover, the detachable soft cover, and the first embodiment of a supporting bed floor.

As illustrated in FIG. 17, the pet bed 100 may incorporate a heating apparatus 884 within the detachable soft cover 200. Alternatively, the pet bed may incorporate a heating apparatus 884 within the supporting bed floor 210. Alternatively, the pet bed 100 may incorporate a heating apparatus 884 between the detachable soft cover 200 and the supporting bed floor 210. Alternatively, the pet bed 100 may incorporate a heating apparatus 884 below the supporting bed floor 210. Alternatively, the pet bed 100 may incorporate a heating apparatus 884 around surfaces of the pet bed 100. The heating apparatus 884 may be elliptical. Alternatively, the heating apparatus 884 may have a geometric shape. Surfaces include but are not limited to the surfaces of the detachable soft cover resting plain 220, surfaces of the detachable soft cover barrier 230, surfaces of the supporting bed floor resting plain 258, surfaces of the supporting bed floor wall 260, and surfaces of the footing members 870.

Figure 15:
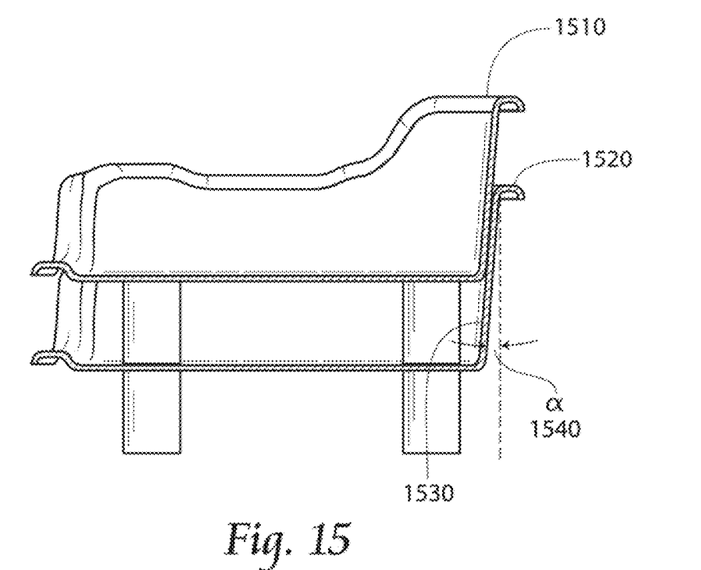
FIG. 15 is a bottom of the second embodiment of the supporting bed floor.
Figure 16:
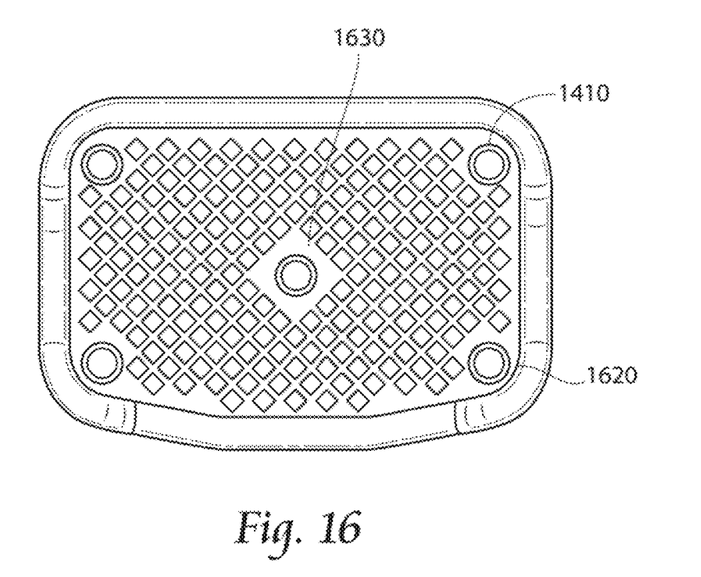
FIG. 16 is a side sectional view of two stackable second embodiments of the supporting bed floor.

With attention to FIG. 15 and FIG. 16, second embodiment of the supporting bed floor 1210 is preferably stackable. As illustrated in FIG. 15, a first supporting bed floor 1510 is stackable on a second supporting bed floor 1520. The supporting bed floor wall 1360 contains a section 1530. The section 1530 is preferably angled at an angle α (1540) away from the flange elbow 1323 along the entire supporting bed floor-perimeter 298, including the section defining the second opening wall 1380. The angle α (1540) provides for the stacking of multiple supporting bed floors 1210. Thus, the supporting bed floor wall 1360 has an angled orientation with respect to the flange elbow 1323 to provide for stacking.

FIG. 16, a bottom view of the supporting bed floor 1210, illustrates footing members 1410 which alternatively may be moldably applied to the supporting bed floor resting plain second side 1376. The footing members 1410 are preferably arranged in the corners 1620 of the supporting bed floor 1210 and in the center 1630 of the supporting bed floor 1210. At least one footing member 1410 is preferably arranged in close proximity to the center 1630 of the supporting bed floor 1210. Alternatively, the footing members 1410 may be arranged in various patterns dependent on the shape of the supporting bed floor 1210, the shape of the pet bed 100, and/or the use of the supporting bed floor 1210 or the pet bed 100. Alternatively, the supporting bed floor 1210 may contain detachable footing members 1410. It is observed the footing members 1410 may be cylindrical. Alternatively, the foot members 1410 may be spherical. Alternatively, the footing members 1410 may be a polyhedron.

As illustrated in FIG. 18, the pet bed 100 may incorporate lighting on one or both of the detachable soft cover 200 and supporting bed floor 1210. The lighting may be at least one lighting element 882. The at least one lighting element 882 is preferably in communication with the supporting bed floor resting plain second side 1376. The at least one lighting element 882 is preferably puck lighting. Alternatively, the at least one lighting element 882 may be LED lighting. Alternatively, the at least one lighting element 882 may be any form of lighting known in the industry. The at least one lighting element 882 is preferably controlled by a remote communication device, not illustrated in the figures. The at least one lighting element 882 may illuminate more than one color. The at least one remote lighting device 882 may change colors. The at least one remote lighting device 882 may turn on and off in various sequences. Various at least one lighting element 882 incorporated on the pet bed 100 may have various color and lighting sequences. The color and lighting features of the at least one remote lighting device 882 are controlled by the remote communication device, not illustrated in the figures.

As illustrated in FIG. 17, the pet bed 100 may incorporate a heating apparatus 884 within the detachable soft cover 200. Alternatively, the pet bed may incorporate a heating apparatus 884 within the supporting bed floor 1210. Alternatively, the pet bed 100 may incorporate a heating apparatus 884 between the detachable soft cover 200 and the supporting bed floor 1210. Alternatively, the pet bed 100 may incorporate a heating apparatus 884 below the supporting bed floor 1210. Alternatively, the pet bed 100 may incorporate a heating apparatus 884 around surfaces of the pet bed 100. The heating apparatus 884 may be elliptical. Alternatively, the heating apparatus 884 may have a geometric shape. Surfaces include but are not limited to the surfaces of the detachable soft cover resting plain 220, surfaces of the detachable soft cover barrier 230, surfaces of the supporting bed floor resting plain 1258, surfaces of the supporting bed floor wall 1360, and surfaces of the footing members 1410.

Figure 9:
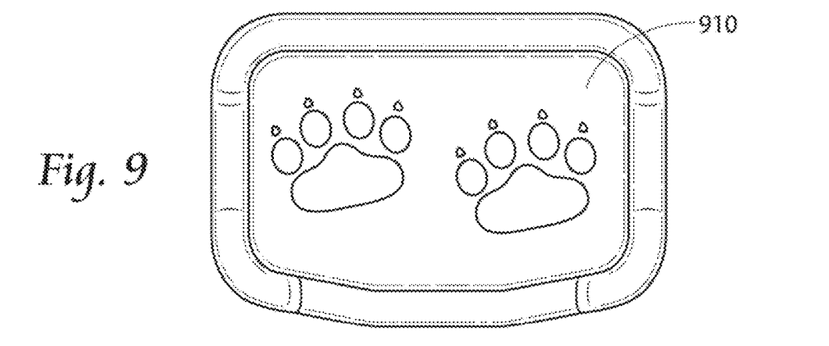
FIG. 9 is a top view of the pet bed containing possible graphics.
Figure 10:
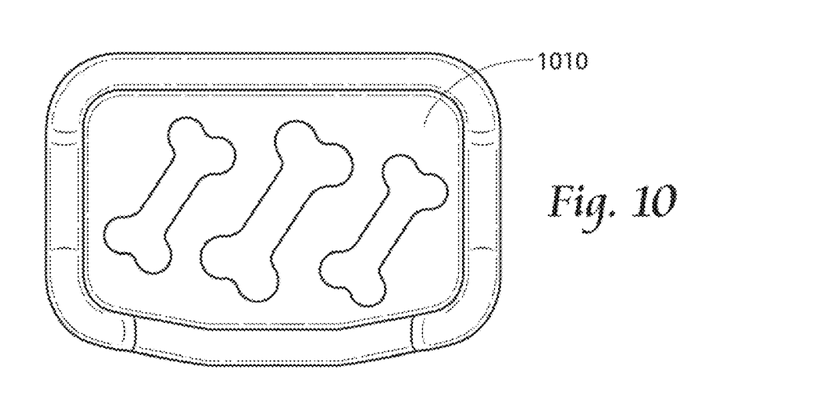
FIG. 10 is a top view of the pet bed containing possible graphics.
Figure 11:
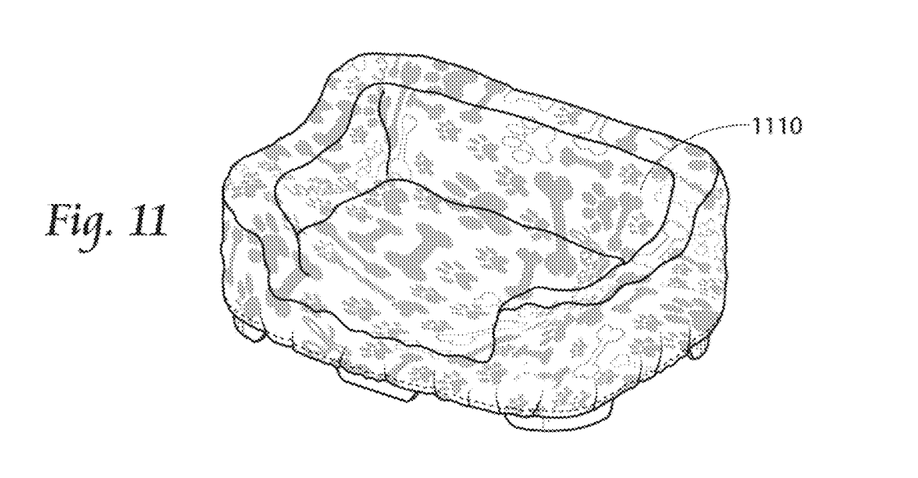
FIG. 11 is a perspective view of the pet bed or supporting bed floor containing a cloth cover.

With attention to FIG. 9, FIG. 10 and FIG. 11, various surface features may be alternatively added. As illustrated in FIG. 9, animal prints 910 may be moldably formed on or depressed into the detachable soft cover 200. Alternatively, the animal prints may be adhered to the detachable soft cover 200. As illustrated in FIG. 10, various animal articles 1010 may be moldably formed on or depressed into the detachable soft cover 200. Alternatively, the various animal articles 1010 may be adhered to the detachable soft cover 200. As illustrated in FIG. 11, a cloth cover 1110 may be may be applied over the detachable soft cover 200. Alternatively, the cloth cover 1110 may be may be applied over the supporting bed floor 210. As illustrated in FIG. 17, the cloth cover 1110 is preferably detachable. Alternatively, the cloth cover 1110 may be fixed to the detachable soft cover 200. The cloth cover 1110 is preferably providing for a fitted communication with at least one of the detachable soft cover 200 and the supporting bed floor (210, 1210). Alternatively, the cloth cover 1110 provides for a loose communication with at least one of the detachable soft cover 200 and the supporting bed floor (210, 1210). The cloth cover 1110 in continuous communication with at least one of the detachable soft cover 200 and the supporting bed floor (210, 1210). Wherein the cloth cover 1110 is in detachable and layered communication with at least one of the detachable soft cover 200 and the supporting bed floor (210, 1210). Alternatively, wherein the cloth cover 1110 is in detachable and layered communication with the detachable soft cover (210, 1210) and the detachable soft cover (210, 1210) is in detachable and layered communication with the supporting bed floor (210, 1210).

Figure 19:
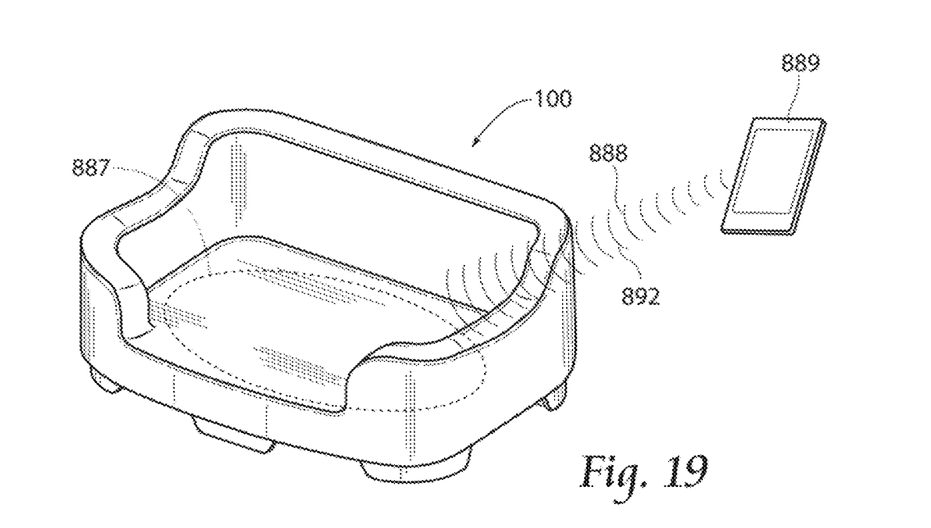
FIG. 19 is a perspective view of the pet bed incorporating an electronic feature which communicates with a communication device.

As illustrated in FIG. 19, the pet bed 100 may incorporate an electronic feature 887 which communicates 888 with a communication device 889. The electronic feature 887 measuring weight of an object [not illustrated in the figures] in the pet bed 100, and the sleeping pattern of any animate object [not illustrated in figures] in the pet bed 100. At least one of the weight and sleeping pattern is known as data 892. The electronic feature 887 communicates 888 the data 892 to the communication device 889, allowing a user of the communication device 889 to view the data 892 through an application [not illustrated in the figures] on the communication device 889.

The invention has the intended purpose of providing a multiple piece pet bed having gradual depressions for the resting of body parts and stackable supporting bed floors. Additionally, the invention has the intended purpose of providing a bed which is mobile while retaining a wall structure for resting body parts.

It is understood that any and all features of the first embodiment of the supporting bed floor 210 may be incorporated in the second embodiment of the pet bed floor 1210. It is understood that any and all features of the second embodiment of the supporting bed floor 1210 may be incorporated in the first embodiment of the pet bed floor 210.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:
1. A pet bed comprising:
   a supporting bed floor comprising a wall structure;
   a primary cover comprising a receiving channel about a circumference of said primary cover;
   said primary cover detachably carried by at least said structure of said supporting bed floor; and
   a secondary cover in detachable and layered communication with at least one of said primary cover and said supporting bed floor.

2. The pet bed according to claim 1, further comprising said wall structure in detachable communication with at least said receiving channel.

3. The pet bed according to claim 1, said primary cover further comprising a closed cell skin material.

4. The pet bed according to claim 1, further comprising said primary cover having at least one side with a height, wherein a body portion may rest.

5. The pet bed according to claim 1, further comprising said wall structure angled with respect to at least one of a first wall location and a second wall location.

6. The pet bed according to claim 1, further comprising said supporting bed floor in communication with at least one of at least one extension and at least one member.

7. The pet bed according to claim 6, further comprising said at least one member is a friction member.

8. The pet bed according to claim 1, said supporting bed floor further comprising at least an injection-molded polymer.

9. The pet bed to claim 1, further comprising said secondary cover in fitted communication with at least one of said primary cover and said supporting bed floor.

10. The pet bed according to claim 1, further comprising said secondary cover in continuous communication with at least one of said primary cover and said supporting bed floor.

11. A pet bed comprising:
a supporting bed floor comprising a wall structure;
a primary cover comprising a receiving channel about a circumference of said primary cover; and
said primary cover detachably carried at least said wall structure of said supporting bed floor.

12. The pet bed according to claim 11, further comprising a secondary cover in detachable communication with at least one of said primary cover and said supporting bed floor.

13. The pet bed according to claim 11, further comprising said structure in detachable communication with at least said receiving channel.

14. The pet bed according to claim 11, said, primary cover further comprising a closed cell skin material.

15. The pet bed according to claim 11, further comprising said primary cover having at least one side with a height, wherein a body portion may rest.

16. The pet bed according to claim 11, further comprising said wall structure angled with respect to at least one of a first wall location and a second wall location.

17. The pet bed according to claim 11, further comprising said supporting bed floor in communication with at least one of at least one extension and at least one member.

18. The pet bed according to claim 7, further comprising said at least one member is a friction member.

19. The pet bed according to claim 11, said supporting bed floor further composing at least an injection-molded polymer.

20. The pet bed according to claim 11, further comprising said secondary cover in at least one of fitted communication and continuous communication with at least one of said primary cover and said supporting bed floor.

* * * * *

UNITED STATES PATENT AND TRADEMARK OFFICE
CERTIFICATE OF CORRECTION

PATENT NO. : 10,905,093 B2
APPLICATION NO. : 16/014743
DATED : February 2, 2021
INVENTOR(S) : Ivars R. Repins et al.

It is certified that error appears in the above-identified patent and that said Letters Patent is hereby corrected as shown below:

In the Claims

Column 16, Line 23, Delete "composing" and insert -- comprising --

Signed and Sealed this
Twenty-eighth Day of June, 2022

Katherine Kelly Vidal
*Director of the United States Patent and Trademark Office*